United States Patent
Fay et al.

(10) Patent No.: US 9,418,661 B2
(45) Date of Patent: Aug. 16, 2016

(54) VEHICLE VOICE RECOGNITION SYSTEMS AND METHODS

(75) Inventors: William Fay, Rockford, MI (US); Brian L. Douthitt, Holland, MI (US); David J. Hughes, Jenison, MI (US); Brian Hannum, Greenville, MI (US)

(73) Assignee: Johnson Controls Technology Company, Holland, MI (US)

( * ) Notice: Subject to any disclaimer, the term of this patent is extended or adjusted under 35 U.S.C. 154(b) by 235 days.

(21) Appl. No.: 14/116,965

(22) PCT Filed: May 11, 2012

(86) PCT No.: PCT/US2012/037594
§ 371 (c)(1),
(2), (4) Date: Jan. 18, 2014

(87) PCT Pub. No.: WO2012/155079
PCT Pub. Date: Nov. 15, 2012

(65) Prior Publication Data
US 2015/0310865 A1     Oct. 29, 2015

Related U.S. Application Data

(60) Provisional application No. 61/485,346, filed on May 12, 2011.

(51) Int. Cl.
| | |
|---|---|
| G10L 15/04 | (2013.01) |
| G10L 15/00 | (2013.01) |
| G10L 15/18 | (2013.01) |
| G10L 15/28 | (2013.01) |
| G10L 15/22 | (2006.01) |

(Continued)

(52) U.S. Cl.
CPC ............. *G10L 15/28* (2013.01); *G10L 15/01* (2013.01); *G10L 15/22* (2013.01); *H04R 1/08* (2013.01); *G10L 15/222* (2013.01); *G10L 2015/227* (2013.01); *H04R 2499/13* (2013.01)

(58) Field of Classification Search
None
See application file for complete search history.

(56) References Cited

U.S. PATENT DOCUMENTS

| | | | |
|---|---|---|---|
| 6,944,592 B1 | 9/2005 | Pickering | |
| 7,979,281 B2 * | 7/2011 | Kahn | G10L 15/22 704/211 |

(Continued)

FOREIGN PATENT DOCUMENTS

| | | |
|---|---|---|
| WO | WO-2005/013262 A1 | 2/2005 |
| WO | WO-2008/053290 A1 | 5/2008 |

OTHER PUBLICATIONS

International Search Report mailed Feb. 4, 2013, as received in corresponding International Patent Application No. PCT/US2012/037594.

(Continued)

*Primary Examiner* — Satwant Singh
(74) *Attorney, Agent, or Firm* — Foley & Lardner LLP

(57) ABSTRACT

A voice recognition system includes a microphone for receiving speech from a user and processing electronics. The processing electronics are in communication with the microphone and are configured to use a plurality of rules to evaluate user interactions with the voice recognition system. The processing electronics automatically determine and set an expertise level in response to and based on the evaluation. The processing electronics are configured to automatically adjust at least one setting of the voice recognition system in response to the set expertise level.

17 Claims, 4 Drawing Sheets

(51) Int. Cl.
  *G10L 15/01* (2013.01)
  *H04R 1/08* (2006.01)

(56) References Cited

U.S. PATENT DOCUMENTS

| | | | | |
|---|---|---|---|---|
| 8,023,666 B2* | 9/2011 | Nakajima | ............... | G10L 15/20 381/110 |
| 8,140,329 B2* | 3/2012 | Zhang | ............... | G10L 25/48 704/231 |
| 9,280,314 B2* | 3/2016 | Kozuka | ............ | H04M 1/72533 |
| 9,299,348 B2* | 3/2016 | Gabara | ................ | G10L 15/265 |
| 2007/0094033 A1 | 4/2007 | Nagashima et al. | | |
| 2007/0150287 A1* | 6/2007 | Portele | ............... | G10L 15/1822 704/275 |
| 2008/0109220 A1* | 5/2008 | Kiss | ........................ | G10L 15/26 704/235 |
| 2009/0313019 A1* | 12/2009 | Kato | ....................... | G10L 17/26 704/254 |
| 2014/0253376 A1* | 9/2014 | Large | ...................... | G01S 19/21 342/357.59 |
| 2014/0316220 A1* | 10/2014 | Sheldon | ............... | A61B 5/0205 600/301 |
| 2015/0269945 A1* | 9/2015 | Taylor | ................ | G06Q 30/0601 704/246 |
| 2016/0004502 A1* | 1/2016 | Winkelman | ............. | G06F 3/167 704/254 |

OTHER PUBLICATIONS

Jokinen, Kristiina, Universal Access in the Information Society; International Journal, Feb. 17, 2006 Springer, Berlin, DE—ISSN 1615-5297, XP019387537.

Litman, Diane J. et al., Thirty Seventh Annual Meeting of the Association of Computational Linguistics, Jan. 1, 1999; Jun. 20, 1999-Jun. 26, 1999 Maryland (Md), pp. 309-316, XP055050865.

International Preliminary Report on Patentability mailed Nov. 21, 2013, as received in corresponding International Patent Application No. PCT/US2012/037594.

* cited by examiner

VEHICLE VOICE RECOGNITION SYSTEMS AND METHODS

CROSS-REFERENCE TO RELATED APPLICATIONS

The present application is a U.S. National Stage of International Application No. PCT/US2012/037594, filed on May 11, 2012, which claims the benefit of U.S. Provisional Application No. 61/485,346, filed on May 12, 2011, the entire disclosures of all of which are incorporated herein by reference.

BACKGROUND

The present invention relates generally to the field of voice recognition systems and methods.

Some voice recognition systems include user-selectable settings. Other voice recognition systems allow a user to manually toggle between modes such as novice, normal, and expert. It is challenging and difficult to develop voice recognition systems (e.g., for a vehicle, for portable electronic devices, for computing devices) that are acceptably usable for users of varying sophistication or familiarity with voice recognition. For example, when a system is not intuitive for a novice user or loaded with excessive prompts for an expert user, the user often becomes frustrated.

SUMMARY

One embodiment of the invention relates to a voice recognition system. The voice recognition system includes a microphone for receiving speech from a user and processing electronics in communication with the microphone. The voice recognition system is configured to use a plurality of rules to evaluate user interactions with the voice recognition system. The processing electronics automatically determine and set an expertise level in response to and based on the evaluation. The processing electronics are configured to automatically adjust at least one setting of the voice recognition system in response to the set expertise level.

The evaluation of user interactions with the voice recognition system may span power cycles of the processing electronics and the adjustment to the voice recognition system may be retained in non-volatile memory such that the adjustment spans power cycles of the processing electronics. The evaluation and adjustment may occur without presenting the user a graphical user interface for making the adjustment and without receiving feedback from the user regarding the particular voice recognition system adjustment. The evaluation and adjustment may occur without prompting the user or without processing a user-requested expertise level or voice recognition system adjustment.

The processing electronics may include a memory device and a user expertise evaluator configured to update and store indicia of user expertise in the memory device across power cycles of the processing electronics. The indicia of user expertise may include at least one of: (a) user response time, (b) command recognition accuracy, (c) command concentration, (d) number of cancel operations requested by the user, (e) number of quit operations, (f) number of exit operations, (g) number of back operations, (h) timeouts, (i) number of affirmative confirmations, (j) number of negative confirmations, (k) false starts, (l) speed of speech of user, (m) volume of speech, (n) tone of speech, (o) use of barge-in, (p) low average recognition confidence, (q) percentage of rejected recognitions, (r) percentage of completed operations, (s) percentage of aborted operations, and (t) relative usage of a voice tree branch.

The user expertise evaluator may be configured to automatically process the indicia of user expertise relative to the plurality of rules. The processing electronics may include a voice recognition engine configured to determine how to adjust the at least one setting of the voice recognition system in response to an updating of the automatically assigned expertise level. The expertise level may be assigned from a set of greater than two expertise levels. In other embodiments, the expertise level may be exactly two expertise levels, a nearly continuous level of expertise levels (e.g., 0-100, used for weighting calculated delays and the like), or any other number of expertise levels. The voice recognition system may be configured to determine a set of setting adjustments associated with each expertise level. The set of setting adjustments may include at least one of: an end of utterance timing adjustment, a start of utterance timing adjustment, a graphical user interface assistance adjustment, an audio assistance adjustment, and a rejection threshold level adjustment. The processing circuit may be configured to continuously conduct the evaluation of the user interactions, wherein the plurality of rules are a part of an expert system and/or a knowledge-based system.

According to another embodiment of the invention, a voice recognition system includes means for evaluating user interactions with the voice recognition system and means for automatically selecting a user expertise level in response to the evaluation. The system further includes means for automatically adjusting at least one setting of the voice recognition system in response to the automatic selection of the user expertise level.

According to another embodiment, a method for a voice recognition system includes automatically adjusting a persistent setting of a voice recognition system based on continuous analysis of a user's interactions with the voice recognition system. The method may further include identifying the user and maintaining, across power cycles of the voice recognition system, a different set of adjustments and a different analysis state for each of a plurality of users of the voice recognition system. The method may further include conducting evaluation and maintaining task-specific persistent setting adjustments for each user.

One embodiment of the present disclosure relates to a voice recognition system for a vehicle. The voice recognition system includes a microphone for receiving speech from a user and processing electronics in communication with the microphone and configured to use a plurality of rules to evaluate user interactions with the voice recognition system. The processing electronics automatically determine and set an expertise level in response to and based on the evaluation. The processing electronics are configured to automatically adjust at least one setting of the voice recognition system in response to the set expertise level.

Another embodiment of the present disclosure relates to a method for personalizing a voice recognition system in a vehicle. The method includes using a plurality of rules to evaluate user interactions with the voice recognition system. The method further includes adjusting at least one setting of the voice recognition system in response to evaluation.

Another embodiment of the present disclosure relates to a voice recognition system for a vehicle. The voice recognition system includes means for evaluating user interactions with the voice recognition system, means for automatically selecting a user expertise level in response to the evaluation, and means for automatically adjusting at least one setting of the voice recognition system in response to the automatic selection of the user expertise level.

Another embodiment of the present disclosure relates to a method for a voice recognition system in a vehicle. The method includes automatically adjusting a persistent setting of a voice recognition system based on continuous analysis of a user's interactions with the voice recognition system.

BRIEF DESCRIPTION OF THE FIGURES

The disclosure will become more fully understood from the following detailed description, taken in conjunction with the accompanying figures, wherein like reference numerals refer to like elements, in which.

DESCRIPTION

Figure 1A:
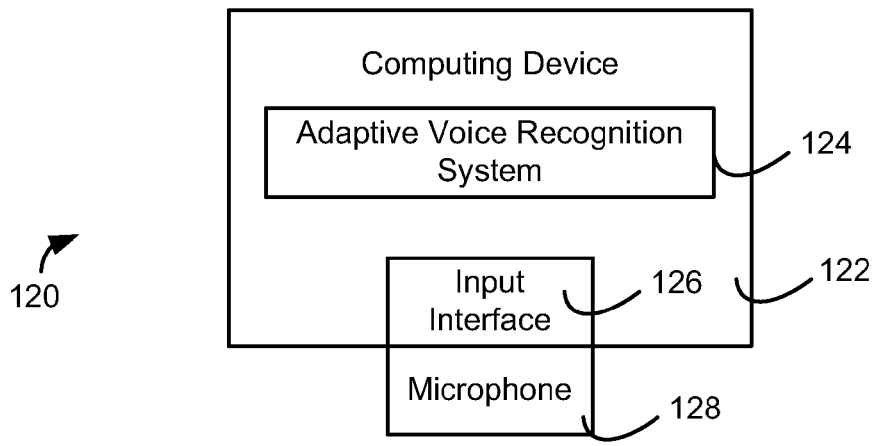
FIG. 1A is a block diagram of a voice recognition system, according to an exemplary embodiment.

Referring generally to the Figures, a voice recognition system is shown. The voice recognition system is configured to automatically adjust voice recognition system settings based on a continuous analysis of a user's interactions with the voice recognition system. The voice recognition system uses this automatic adjustment to dynamically adapt to the expertise and speaking characteristics of a user.

In an exemplary embodiment, an adaptive voice recognition system is configured to evaluate voice recognition system usage behavior using a set of rules. The rules may include, but are not limited to, user response time, command recognition accuracy, command concatenation, number of cancel, quit, exit or 'go back' operations used, timeout metrics, affirmative and negative confirmations, false starts (i.e., speaking before a beep), speed of speech of users (for end of utterance), volume of speech, tone of speech (angry, frustrated), use of barge-in (interruption of system prompts to enable next user command), low-confidence (rejected recognition) results, completed and aborted operations, number of times a user has traversed a specific area of the voice tree, or other voice recognition system usage statistics. In response to evaluations of the voice recognition system usage relative to the rules, the system can automatically adapt the voice recognition system to more closely match the expertise and speaking characteristics of the user. The system may include multiple user expertise levels (or a continuum of experience) and the system can automatically adjust to the appropriate expertise level based on a perceived expertise of the user. The voice recognition system settings that can be adapted in response to the evaluated expertise level may include, e.g., end of utterance timing, start of utterance timing, total time to wait for a user command, level of graphical user interface assistance, level of audio assistance or prompts, voice recognition threshold level, and/or other voice recognition system settings.

In an exemplary embodiment, the voice recognition system may be configured to allow user feedback to override the automatic adaptation settings (e.g., by manually selecting from a set of system usability or operation options). In some embodiments, the evaluation statistics, the resultant evaluation levels, and the settings changed in response to the evaluation are persistent over power cycles (e.g., stored in non-volatile memory, retained over complete power-downs, reboots, or restarts, retained over ignition cycles if used in a vehicle environment, etc.). Some embodiments of the voice recognition system can conduct user-specific evaluations (e.g., maintain user-specific evaluation statistics, maintain user-specific evaluation results or levels, maintain user specific voice recognition settings, etc.). The voice recognition system may identify the user based on any number of methods including portable electronic device (e.g., mobile phone, PDA, key fob) recognition, seating setting recognition, voice (e.g., tone, spoken identification, etc.) recognition, or another form of user (e.g., driver) recognition.

In some embodiments of the voice recognition system, at least two conditions are used to help determine the appropriate expertise level for the voice recognition system. The user expertise level, for example, can be raised or lowered based on (a) the user's average response time to system prompts, and (b) the number of errors made by the system in recognizing the user's responses. In other embodiments, alternative or additional expertise indicators are used in the voice recognition system's evaluation of user expertise. To implement the variable user expertise levels and accompanying evaluations, the voice recognition system may include knowledge-base driven evaluation logic, adaptive expert system based evaluation logic, thresholding based logic, rule based logic, combinations of different logic and heuristics, and/or other artificial intelligence methods for conducting evaluations (real time, near real time, not real time) of user behavior.

In some embodiments, the system continuously evaluates user expertise indicators or conditions. In such embodiments, for example, every time a voice recognition system event occurs (e.g., an attempted recognition, a command executes in response to a voice recognition, the user quits a voice recognition process, etc.), an expertise evaluator is provided or otherwise receives information regarding the event, determines whether an update to the expertise level or a setting is warranted, and causes the voice recognition system to make the appropriate adjustment. As an example of the set of adjustments that the voice recognition system could make in response to a determination that user expertise should be increased, the system could decrease the number or complexity of user prompts, decrease time-out values, and decrease the amount of time allotted for recognition between commands.

With reference to FIG. 1A, a simplified block diagram of a voice recognition system 120 is shown, according to an exemplary embodiment. Voice recognition system 120 includes a computing device 122 (e.g., desktop personal computer, laptop computer, computing tablet, a mobile phone, a portable electronic device, a navigation device, home appliance with an integrated voice recognition feature, home entertainment device with an integrated voice recognition feature, gaming device with an integrated voice recognition feature, industrial device with an integrated voice recognition feature, a peripheral device that adds voice recognition to another device, etc.). Computing device 122 includes an input interface 126 (e.g., a wireless transceiver, a wired interface, a port, a jack, a terminal, communications hardware, etc.) coupled to a microphone 128. Using speech received at microphone 128 and resulting audio signals received by input interface 126, adaptive voice recognition system 124 (e.g., processing electronics) uses a plurality of rules to evaluate user interactions with voice recognition system 120. Adaptive voice recognition system 124 is configured to automatically determine and set an expertise level in response to and based on the evaluation. Adaptive voice recognition system 124 can then automatically adjust at least one setting of the voice recognition system in response to the set expertise level.

In some embodiments, adaptive voice recognition system 124's evaluation of user interactions with voice recognition system 120 can span power cycles of computing device 122 or adaptive voice recognition system 124. For example, the adjustment to the voice recognition can be retained in non-volatile memory such that the adjustment spans power cycles of the circuitry used to implement adaptive voice recognition system 124. In some embodiments, the evaluation and adjustment conducted by adaptive voice recognition system 124 can occur without presenting the user a graphical user interface for making the adjustment and without receiving feedback from the user regarding the particular voice recognition system adjustment. In other embodiments, while the user can manually select certain expertise levels and voice recognition settings, the automatically adaptive feature discussed herein can be enabled or disabled. When enabled, the expertise level can be set automatically and without any manual user adjustment. In other embodiments, the user can manually "lock" certain features or settings of the voice recognition system while allowing the automatic adjustment of others based on expertise.

Adaptive voice recognition system 124 can include (or otherwise access) a memory device (e.g., non-volatile memory) and adaptive voice recognition system 124 can include a user expertise evaluator. The user expertise evaluator may be configured to update and store indicia (e.g., statistics, variables, indicators, values, counts, sub-levels, data, etc.) of user expertise in the memory device (e.g., across power cycles of the processing electronics). The indicia of user expertise can include, for example, (a) user response time, (b) command recognition accuracy, (c) command concentration, (d) number of cancel operations requested by the user, (e) number of quit operations, (f) number of exit operations, (g) number of back operations, (h) timeouts, (i) number of affirmative confirmations, (j) number of negative confirmations, (k) false starts, (l) speed of speech of user, (m) volume of speech, (n) tone of speech, (o) use of barge-in, (p) low average recognition confidence, (q) percentage of rejected recognitions, (r) percentage of completed operations, (s) percentage of aborted operations, and (t) relative usage of a voice tree branch. The user expertise evaluator may be further configured to automatically process the indicia relative to the plurality of rules. For example, a rule may be established that causes adaptive voice recognition system 124 to automatically lower the expertise level upon detecting that the average number of failed speech operations exceeds the average number of successful speech operations.

Processing electronics of adaptive voice recognition system 124 may further include a voice recognition engine configured to determine how to adjust a setting or settings of the voice recognition system in response to an updating of the automatically assigned expertise level. Determining how to adjust a setting can include processing to estimate the source of problems. For example, if system 124 determines that the user frequently provides more words than the system can understand at one time, system 124 may increase the number of prompts provided to the user and ask for fewer pieces of information at one time. Rather than broadly prompt for a destination, for example, system 124 may adjust its settings to first ask for a state, then a city, and finally a particular street address. In an exemplary embodiment, the expertise level is assigned from a set of greater than two expertise levels. For example, there may be a novice level, a default level, and an expert level. As expertise is evaluated, system 124 can automatically and adaptively adjust the expertise level. In other embodiments, the expertise level may be exactly two expertise levels, a nearly continuous level of expertise levels (e.g., 0-100, used for weighting calculated delays and the like), or any other number of expertise levels.

In an exemplary embodiment, the set of setting adjustments can include, for example, an end of utterance timing adjustment, a start of utterance timing adjustment, a graphical user interface assistance adjustment, an audio assistance adjustment, and a rejection threshold level adjustment. In an exemplary embodiment, the adaptive voice recognition system may be configured to continuously conduct the evaluation of the user interactions and wherein the plurality of rules are a part of an expert system, a neural network-based system, an artificial intelligence system, a statistics-based system, and/or a knowledge-based system.

Figure 1B:
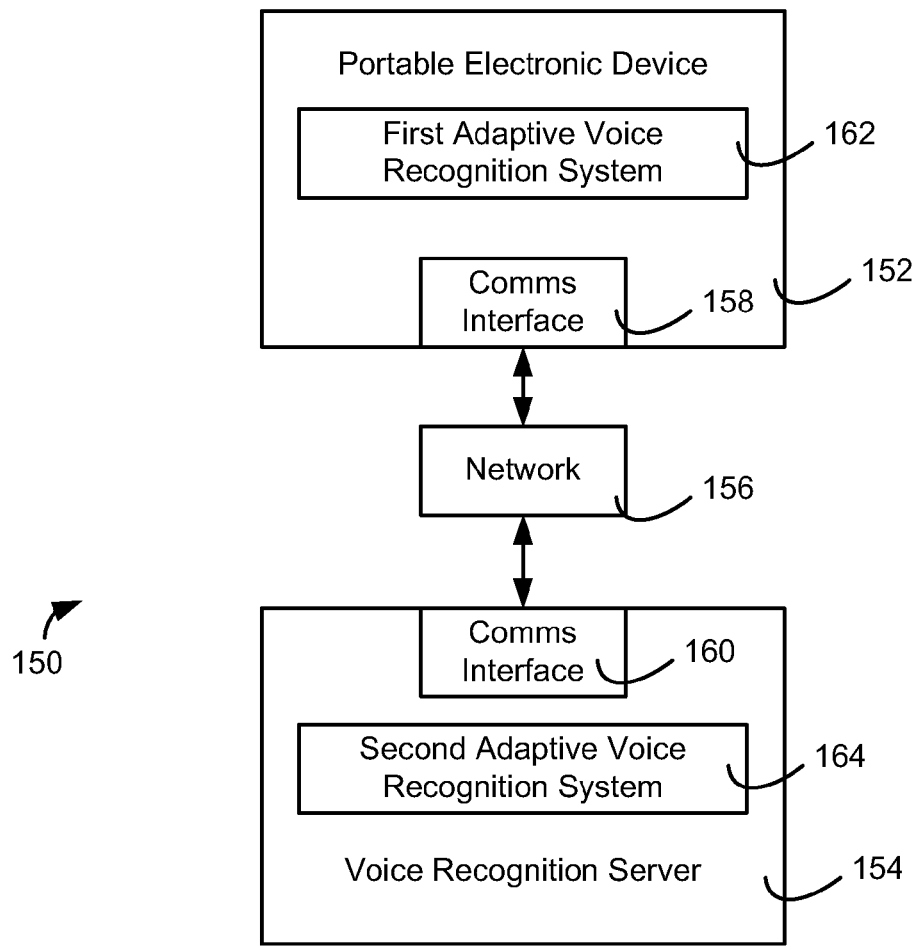
FIG. 1B is a block diagram of another voice recognition system, according to another exemplary embodiment.

Referring now to FIG. 1B, another embodiment of a voice recognition system 150 is shown. Voice recognition system 150 includes a portable electronic device 152 and a voice recognition server 154. Portable electronic device 152 and voice recognition server 154 may work together via communications interfaces 158, 160 and network 156 to conduct voice recognition tasks. For example, a voice recognition engine of portable electronic device 152 may conduct a first level of recognition (e.g., determine keywords, determine basic commands) while a voice recognition engine of server 154 may conduct voice recognition on audio signals that portable electronic device 152 has been unable to recognize. If portable electronic device 152 determines that it cannot recognize an audio signal (e.g., based on speech received at a microphone of the portable electronic device), portable electronic device 152 can then send the unrecognized audio signal to voice recognition server 154 via communications interface 158.

As shown in FIG. 1B, both portable electronic device 152 and voice recognition server 154 include an adaptive voice recognition system 162 and 164. Portable electronic device 152's first adaptive voice recognition system 162 and voice recognition server 154's second adaptive voice recognition system 164 may operate together to use a plurality of rules to evaluate user interactions with voice recognition system 150. First adaptive voice recognition system 162 and/or second adaptive voice recognition system 164 (e.g., and/or processing electronics thereof) then automatically determine and set an expertise level in response to and based on the evaluation. First adaptive voice recognition system 162 and/or second adaptive voice recognition system 164 are configured to automatically adjust at least one setting of voice recognition system 150 in response to the set expertise level.

First adaptive voice recognition system 162 and second adaptive voice recognition system 164 can differently contribute to the determination of expertise level setting. For example, first adaptive voice recognition system 162 may be configured to detect certain indications of low or high expertise (e.g., speech timing, speech delays, speech amplitude, etc.) while second adaptive voice recognition system 164 may be configured to detect other indications of low or high expertise (e.g., phonemic accuracy, phonemic consistency, percentage of recognized words or phrases, etc.).

In alternative embodiments, only one of portable electronic device 152 and voice recognition server 154 may include an adaptive system. For example, the portable electronic device 152 may include an adaptive voice recognition system configured to adjust expertise level and resulting settings in a manner expected to contribute to the ability of a non-adaptive voice recognition system of voice recognition server to recognize speech.

Figure 1C:
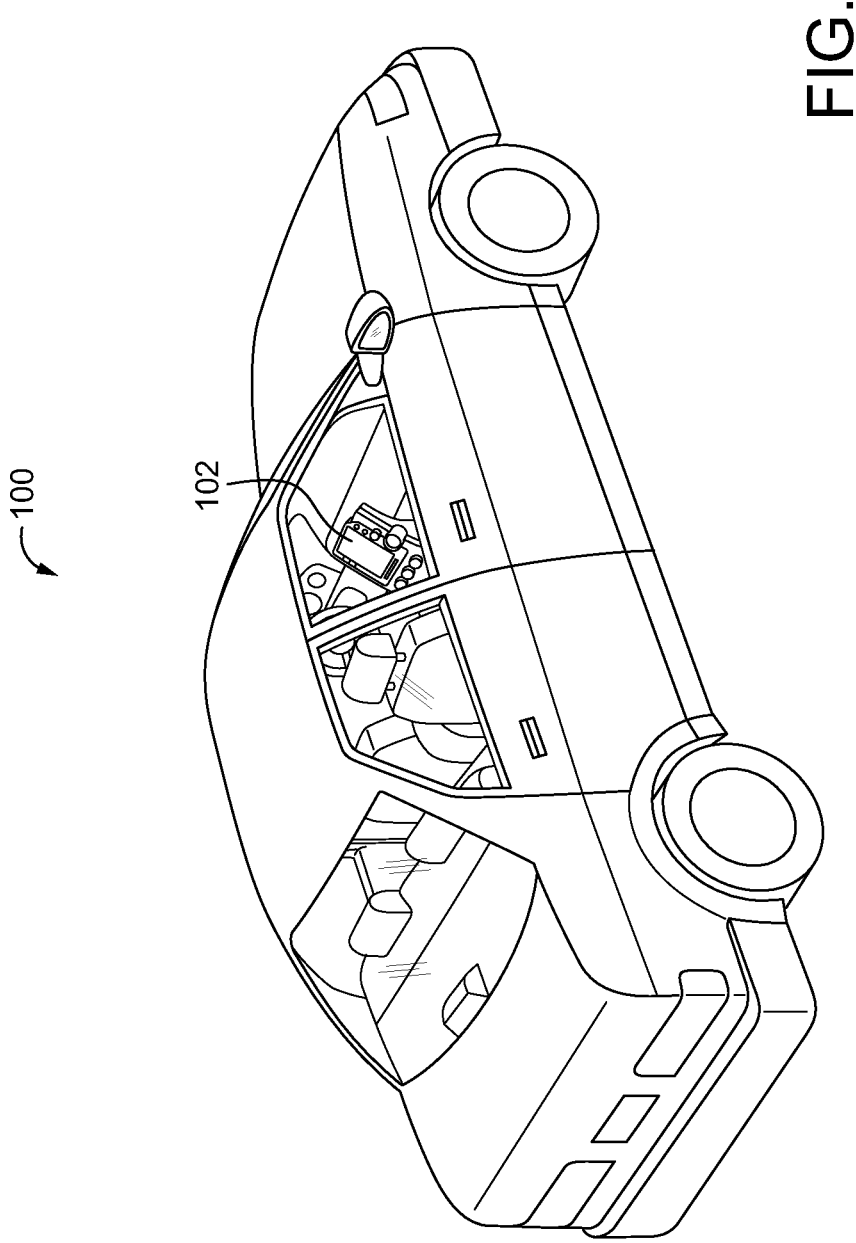
FIG. 1C illustrates yet another exemplary embodiment and is an environment view of a vehicle with a telematics system.
Figure 2:
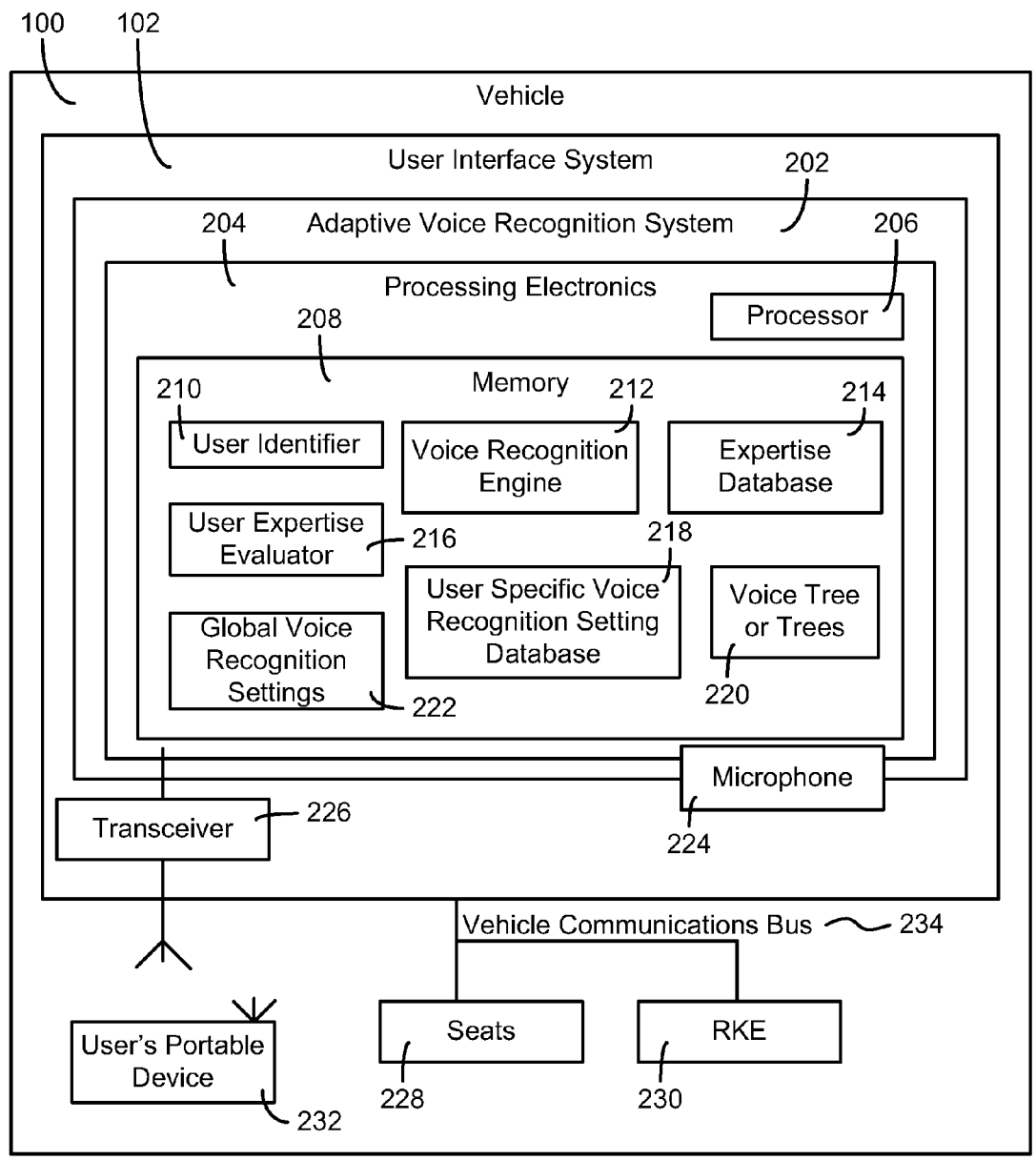
FIG. 2 is a block diagram of the vehicle and telematics system of FIG. 1C, according to an exemplary embodiment.

Referring now to FIGS. 1C and 2, some embodiments of the invention relate to an adaptive voice recognition system 202 for a vehicle 100. While FIG. 2 provides detail of the example of FIG. 1C, it should be understood that the detailed block diagram of FIG. 2 may be provided within other embodiments such as those of FIGS. 1A and 1B.

Voice recognition system 202 is shown as a part of a user interface system 102 of vehicle 100. User interface system 102 includes a microphone 224 to which adaptive voice recognition system 202 is coupled. User interface system 102 further includes a transceiver 226 coupled to adaptive voice recognition system 202. User interface system 102 may include any number of displays (e.g., LCD displays, touch screen displays, etc.), any number of user interface elements (e.g., buttons, switches, touch screen elements for selection, dials, joysticks, steering-wheel mounted controls, etc.). User interface system 102 may include communications features (e.g., BLUETOOTH phone connectivity, garage door communications systems such as HOMELINK sold by Johnson Controls, etc.), user comfort and convenience features, safety features, entertainment features such as radio, or other user interfacing features.

While adaptive voice recognition system 202 is shown as being a part of user interface system 102, in some embodiments user interface system 102 may be separate from adaptive voice recognition system 202. In yet other embodiments, voice recognition system 202 may be distributed across user interface system 102 and other vehicle systems. In yet other embodiments, adaptive voice recognition system 202 may be a part of a vehicle navigation system, part of a telematics system, or a stand-alone device that provides inputs and outputs to vehicle subsystems such as the vehicle navigation system, the vehicle HVAC system, the vehicle radio system, and the like. All such architectures and combinations thereof are within the scope of this disclosure. Claims may be presented in this or a subsequent application to narrow the invention to any one embodiment or set of embodiments.

Adaptive voice recognition system 202 includes processing electronics 204. Processing electronics 204 are shown to include a processor 206 and memory 208. Processor 206 can be implemented as a general purpose processor, an application specific integrated circuit (ASIC), one or more field programmable gate arrays (FPGAs), a group of processing components, or other suitable electronic processing components. Processing electronics 204 can include one more printed circuit boards or point-to-point wirings of electronic components including processor 206 and memory 208.

Memory 208 is one or more devices (e.g., RAM, ROM, flash memory, hard disk storage, etc.) for storing data and/or computer code for completing and/or facilitating the various processes or steps described in the present disclosure. Memory 208 may be or include volatile memory or non-volatile memory. Memory 208 may include database components, object code components, script components, or any other type of information structure for supporting the various activities and information structures described in the present disclosure. According to an exemplary embodiment, memory 208 is communicably connected to processor 206 via processing electronics 204 and includes computer code for executing (e.g., by processing electronics 204 and/or processor 206) one or more processes described herein.

Adaptive voice recognition system 202 receives speech (i.e., analog or digital signals representative of speech) from a user via microphone 224. Processing electronics 204 are generally configured to use a set of rules (e.g., as a part of a knowledge base system, an expert system, etc.) to evaluate user interactions with adaptive voice recognition system 202. Processing electronics 204 are further configured to adjust adaptive voice recognition system 202 in response to the evaluation.

Memory 208 is shown to include a number of modules and databases that may be executed, accessed, or otherwise utilized by the processor/processing electronics to provide the activities described herein, according to varying exemplary embodiments. Memory 208 includes a user expertise evaluator 216. User expertise evaluator 216 is configured to evaluate user interactions with voice recognition system 202 and to make expertise decisions based on the evaluation. The expertise evaluations can result in expertise level changes, adjustments along a continuum of expertise, or an output of expertise determinations for another module, database, device or subsystem. User expertise evaluator 216 can use any number of user interaction metrics during and/or across power cycles of the vehicle to conduct its evaluations.

An expertise database 214 is also shown in memory 208. Expertise database 214 can include rules (e.g., thresholds, multi-condition rules, logic trees, knowledge bases, statistical generations such as averages, the data necessary for maintaining a moving average, moving average parameters, standard deviations, etc.) or other information structures, for conducting the evaluation and for use by user expertise evaluator 216.

User expertise evaluations (e.g., determinations, metrics) can be used (e.g., by user expertise evaluator 216, by another module of memory 208 and/or processing electronics 204) to cause settings in global voice recognition settings module 222 or user specific voice recognition setting database 218 to update. In addition to storing rules or metrics for evaluation, expertise database 214 can also store expertise-to-setting adjustment associations. Additionally or alternatively, such associations can be stored in global voice recognition settings module 222 or user specific voice recognition setting database 218. In some embodiments, such associations may be hard coded into a routine of user expertise evaluator 216 or otherwise programmed into processing electronics 204 or memory 208. Adjusting a setting of global voice recognition settings module 222 or user specific voice recognition setting database 218 can include, for example, updating values in a row, changing flags associated with active features, or otherwise changing the data that voice recognition engine 212 uses to determine how to operate.

Voice recognition engine 212 is primarily responsible for operating the main routine or features of adaptive voice recognition system 202 (e.g., using voice recognition processing and associated logic of signals from microphone 224 to provide feedback, commands, or information to user interface system 102). Voice recognition engine 212 can process a voice tree or trees 220 in view of the stored settings to step through a series of questions or other information-gathering prompts and decisions.

According to an exemplary embodiment, voice tree or trees 220 (which include logical associations or flows through varying voice menus) can be different depending on the user and the user's expertise level. Expertise database 214 may associate different expertise levels with different specific voice tasks or applications. For example, evaluation of user interaction with adaptive voice recognition system 202 can indicate that a user is an expert with a phone application or a phone branch of voice tree 220 and a novice with a global position system (GPS) application or branch of voice tree 220. These different expertise levels can be represented in expertise database 214, user specific voice recognition setting database 218, and/or global voice recognition settings module 222 and processed by voice recognition engine 212. In the example of a user having an 'expert' phone expertise level and a 'novice' GPS expertise level, voice recognition system 202 may automatically adapt by providing very few prompts, providing early speech window starts, early speech window stops, allow a user to speak an entire number rather than three digit increments, or provide other advanced features to the expert phone user. In the same example, adaptive voice recognition system 202 may provide many prompts when traversing a novice voice tree portion, late speech window starts, late speech window stops, or a long elapsed time before stopping a speech window, may require a user to enter information in relatively small increments, or may provide other novice-assisting features. Accordingly, embodiments of the systems and methods described herein can dynamically determine the need for and adjust voice trees 220 for adaptive voice recognition system 202. Different portions of voice tree 220 can be dynamically adjusted to a first expertise level and another portion of voice tree 220 can be dynamically adjusted to a second expertise level. The adjustments can provide a fully custom voice tree in response to persistent data resulting from user experience analysis.

The voice recognition system FIG. 2 is further shown to include a user identifier module 210. User identifier module 210 can identify users based on a variety of different factors. In other embodiments, user identifier module 210 focuses on one factor in its user identification logic. User identifier module 210 can request that a user provide input when the user enters the vehicle to provide such identification (e.g., ask the user to speak his or her name, prompt the user to press a touch screen area for selection of a name on a graphical user interface, etc.). In some embodiments user identifier module 210 can be configured to check vehicle seat positions 228 to determine the identity of the user.

In the same or yet other embodiments, user identifier module 210 can be configured to process an identity of the user's remote keyless entry (RKE) device. In such an embodiment, the RKE subsystem 230 of vehicle 100 can provide the identity to adaptive voice recognition system 202 via vehicle communications bus 234. In other exemplary embodiments, user identifier module 210 can process other inputs available on vehicle communications bus 234 or otherwise available to user interface system 102 to conduct the user identification. In an exemplary embodiment, user identifier module 210 uses data from transceiver 226 (e.g., a Bluetooth transceiver, a USB transceiver, etc.) to determine the identity of the user based on a user's portable device 232. In other words, user identifier module 210 may operate by determining which mobile phone is within the vehicle cabin and connected to transceiver 226 for use in telematics activities.

Another embodiment of the invention relates to a method for personalizing a voice recognition system in a vehicle. The method includes using a plurality of rules to evaluate user interactions with the voice recognition system. The method further includes adjusting at least one setting of the voice recognition system in response to the evaluation.

Figure 3:
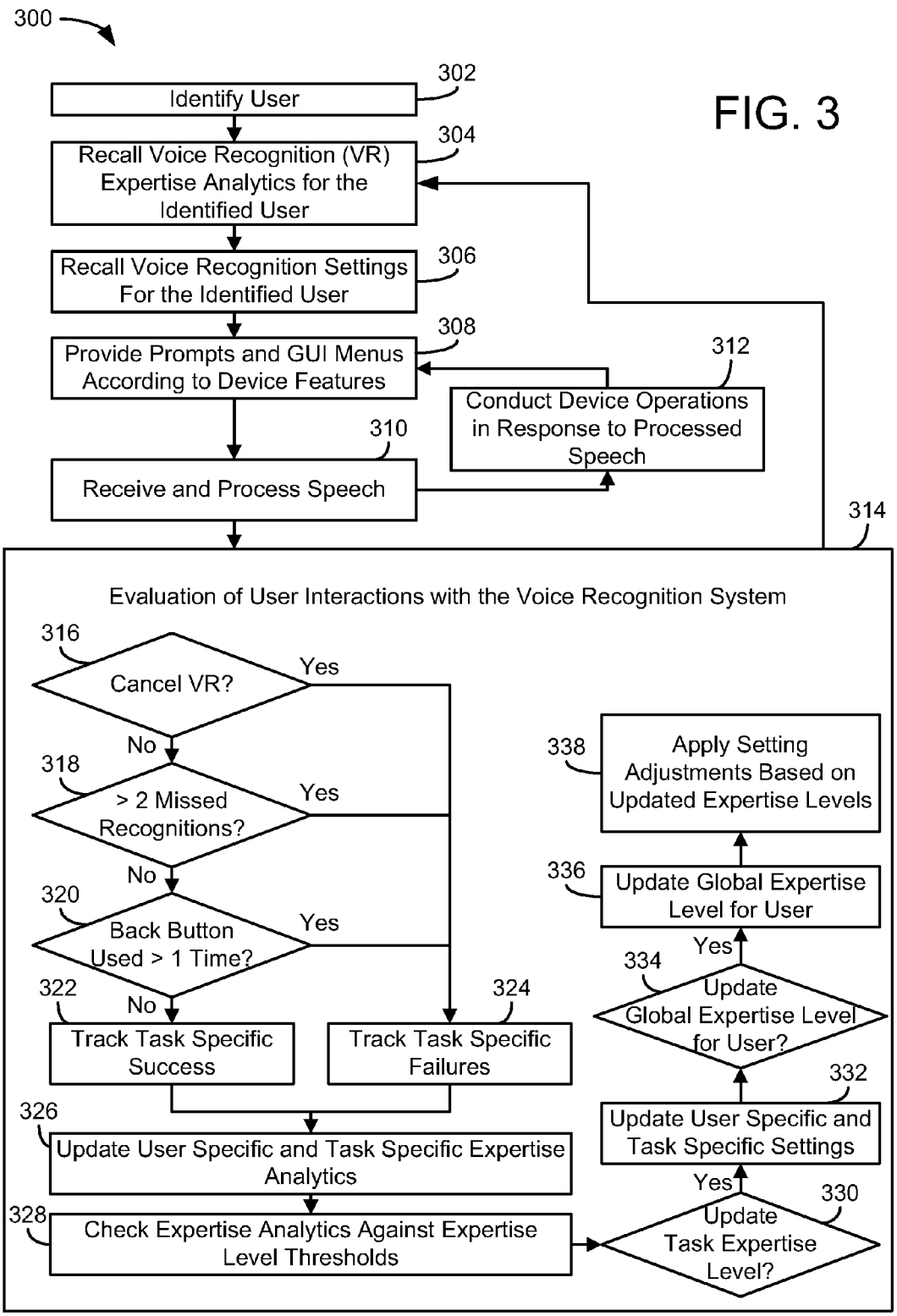
FIG. 3 is a flow chart of a process for adjusting voice recognition system settings, according to an exemplary embodiment.

Referring now to FIG. 3, an exemplary flow chart of a process 300 for conducting the evaluation of a user expertise level and for automatically adjusting voice recognition system settings in response to the evaluation is shown, according to an exemplary embodiment. The flow chart of FIG. 3 can be implemented using the systems shown and described with reference to any of FIGS. 1A-1C and 2. In other embodiments, other computerized systems or processing electronics-based systems may be used to implement the process of FIG. 3. FIG. 3 illustrates one example of an adaptive voice recognition system or method. Other processes for implementing the adaptive voice recognition system could be provided according to varying exemplary embodiments.

Process 300 of FIG. 3 is shown to include identifying a user (step 302). A user may be identified by a detected password, an input username, a biometric entry, voice recognition or another process for identifying a user. Once the user is identified, the adaptive voice recognition system can recall voice recognition expertise analytics for the identified user (step 304). Expertise analytics recalled may include one or more counted, statistical, or estimated indicia of expertise. For example, the expertise may include one or more of (a) user response time, (b) command recognition accuracy, (c) command concentration, (d) number of cancel operations requested by the user, (e) number of quit operations, (f) number of exit operations, (g) number of back operations, (h) timeouts, (i) number of affirmative confirmations, (j) number of negative confirmations, (k) false starts, (l) speed of speech of user, (m) volume of speech, (n) tone of speech, (o) use of barge-in, (p) low average recognition confidence, (q) percentage of rejected recognitions, (r) percentage of completed operations, (s) percentage of aborted operations, and (t) relative usage of a voice tree branch. In the particular embodiment illustrated in FIG. 3, the process 300 uses voice recognition successes and failures as indicia of expertise.

Process 300 further includes recalling voice recognition settings for the identified user (step 306). Voice recognition settings may include, for example, an end of utterance timing adjustment, a start of utterance timing adjustment, a graphical user interface assistance adjustment, an audio assistance adjustment, and/or a rejection threshold level adjustment. Process 300 also includes providing prompts and GUI menus according to device features (step 308). The particular prompts, GUI menus, and or features may vary by device. If the device is a tablet, laptop, or mobile phone, the features may include application, word processing, calendar, or other office tasks (for example). If the device is a vehicle user interface system, the features may include vehicle navigation or vehicle telematics features, by way of another example.

The voice recognition system executing process 300 may then receive and process speech (step 310) and conduct device operations in response to recognized speech (step 312). In parallel or in series with such processing, process 300 is shown to include evaluating user interactions with the voice recognition system (step 314). Evaluating user interactions with the voice recognition system can include a plurality of steps involving the evaluation and subsequent setting adjustment described herein. One example is shown in step 314 of FIG. 3. Step 314 of FIG. 3 includes determining whether the user has cancelled voice recognition (step 316). If the user has cancelled voice recognition, the process can track task specific failures (step 324). Tracking task specific failures can include, for example, maintaining a count of recent failures for each of a plurality of tasks (e.g., finding an address, dialing a number, playing a new album, adjusting an HVAC setting, etc.). If voice recognition is not determined to have been cancelled, process 300 is shown to include determining whether there have been more than two missed recognitions in a single voice recognition (VR) session (step 318). If there have been more than two missed recognitions, then the system may proceed to track task specific failures (step 324). If there have not been more than two missed recognitions, process 300 may execute the step of determining whether the back button has been used more than one time during a single voice recognition session or attempt (step 320). If so, process 300 includes tracking task specific failures (step 324). If the three determinations involving VR failure are all false, then the system or process may track that the task has been a success (step 322). Tracking that a task has been a success may involve positively adding to a success count, subtracting from a failure count, and/or resetting a count or a timer.

Once task specific successes or failures have been tracked, process 300 includes updating a user specific and task specific expertise analysis (step 326). Step 326 can be used in conjunction with tracking steps 322 and 324 to, for example, set a first expertise level for a first task (e.g., music playback) and another expertise level for a second task (e.g., navigation). By way of further example, if the expertise level is determined to be high for music playback, then a VR setting may be adjusted for faster VR entry of music playback parameters. If the expertise level is determined to be low for navigation, on the other hand, then a VR setting may be adjusted for slower VR entry of navigation parameters. The need for adjustment can be determined (in step 330) by checking expertise analytics against expertise level thresholds (step 328). In response to a positive determination that an expertise level should be updated in step 330, process 300 then includes updating user specific and task specific settings (step 332).

It should be noted that in addition to task specific settings, a certain number of global failures or successes can result in a global expertise level adjustments. Step 334 includes a decision step for determining whether to update global expertise level. If it is determined that a global expertise level for a user should be updated (e.g., due to the total number of failures and successes) at step 336 then the process may bump all of the adjustments that could be made up or down, depending on the particular expertise determination. Process 300 further includes applying setting adjustments based on updated expertise levels (step 338). Applying setting adjustments may include setting one or more VR variables that will affect future iterations of process 300. Step 314 is shown to loop back to step 304 in the process 300 illustrated in FIG. 3.

In an exemplary embodiment, the systems described herein do not adapt the processing of actual user speech or parts of speech (e.g., change how vocal tones are processed, change how noise is processed, etc.) in response to the user expertise evaluations. Yet further, in an exemplary embodiment, the systems described herein do not merely determine and execute an audio feedback requirement based on the user evaluations.

The methods described herein may be computer-implemented methods and may be executed by one or more computer systems or electronic systems as described herein. Instructions for causing the computer systems to complete the activities of the above-described methods may be embodied on computer-readable media such as a CDROM, flash drive, or otherwise. All such embodiments of the invention are within the scope of the present disclosure.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. It should be understood that the present disclosure is not limited to the details or methodology set forth in the description or illustrated in the figures. It should also be understood that the terminology is for the purpose of description only and should not be regarded as limiting.

What is claimed is:

1. A voice recognition system, comprising:
a microphone configured to receive speech from a user and convert the speech to an audio speech signal; and
a voice recognition engine configured to:
cause a user expertise evaluator module to detect an indication of an expertise level of the audio speech signal received from the microphone;
set an expertise level for the user in a voice recognition setting database based on the indication of the expertise level;
retrieve an expertise-to-adjustment association from an expertise database;
automatically adjust a voice tree in a voice tree database based on applying the expertise-to-adjustment association to the expertise level for the user;
process the adjusted voice tree to generate a prompt in response to the received speech; and
output the prompt to the user.

2. The voice recognition system of claim 1, wherein the voice recognition setting database and the voice tree database are located in non-volatile memory such that the setting of the expertise level and the adjustment to the voice tree span power cycles of the voice recognition system.

3. The voice recognition system of claim 2, wherein the adjustment to the voice tree occurs without presenting the user a graphical user interface for making the adjustment and without receiving feedback from the user regarding the particular adjustment.

4. The voice recognition system of claim 3, wherein the the user expertise evaluator module is further configured to detect the indication of an expertise level of the audio speech signal based on at least one of:
(a) user response time, (b) command recognition accuracy, (c) command concentration, (d) number of cancel operations requested by the user, (e) number of quit operations, (f) number of exit operations, (g) number of back operations, (h) timeouts, (i) number of affirmative confirmations, (j) number of negative confirmations, (k) false starts, (l) speed of speech of user, (m) volume of speech, (n) tone of speech, (o) use of barge-in, (p) low average recognition confidence, (q) percentage of rejected recognitions, (r) percentage of completed operations, (s) percentage of aborted operations, and (t) relative usage of a voice tree branch.

5. The voice recognition system of claim 4, wherein the user expertise evaluator module is further configured to automatically detect the indication of an expertise level in response to the microphone receiving the audio speech signal.

6. The voice recognition system of claim 5, wherein the expertise level is selected from a set of greater than two expertise levels.

7. The voice recognition system of claim 6, wherein the voice recognition system is configured to determine a set of voice tree adjustments associated with each expertise level.

8. The voice recognition system of claim 7, wherein the set of setting adjustments comprises at least one of:
an end of utterance timing adjustment,
a start of utterance timing adjustment,
a graphical user interface assistance adjustment,
an audio assistance adjustment, and
a rejection threshold level adjustment.

9. The voice recognition system of claim 1, wherein the voice recognition system is configured to continuously receive an audio speech signal via the microphone and continuously operate the voice recognition engine in response to receiving the audio speech signal, and wherein the user expertise evaluator module is further configured to detect the indication of the expertise level using a plurality of rules that are a part of an expert system and/or a knowledge-based system.

10. A computerized method for personalizing a voice recognition system, comprising:
receiving, at a microphone of the voice recognition system, speech from a user;
converting, by the microphone, the speech to an audio speech signal;
causing, by a voice recognition engine of the voice recognition system, a user expertise evaluator module to detect an indication of an expertise level of the audio speech signal received from the microphone;
setting, by the voice recognition engine, an expertise level for the user in a voice recognition database based on the indication of the expertise level;
retrieving, by the voice recognition engine, an expertise-to-adjustment association from an expertise database;
automatically adjusting, by the voice recognition engine, a voice tree in a voice tree database based on applying the expertise-to-adjustment association to the expertise level for the user;
processing, by the voice recognition engine, the adjusted voice tree to generate a prompt in response to the received speech; and
outputting, by the voice recognition engine, the prompt to the user.

11. The method of claim 10, wherein the voice recognition setting database and the voice tree database are located in non-volatile memory such that the adjustment setting of the expertise level and the adjustment to the voice tree span power cycles of the voice recognition system.

12. The method of claim 10, wherein the adjustment to the voice tree occurs without presenting the user a graphical user interface for making the adjustment and without receiving feedback from the user regarding the particular adjustment.

13. The method of claim 12, wherein the user expertise evaluator module is further configured to detect the indication of an expertise level of the audio speech signal based on at least one of:
(a) user response time, (b) command recognition accuracy, (c) command concentration, (d) number of cancel operations requested by the user, (e) number of quit operations, (f) number of exit operations, (g) number of back operations, (h) timeouts, (i) number of affirmative confirmations, (j) number of negative confirmations, (k) false starts, (l) speed of speech of user, (m) volume of speech, (n) tone of speech, (o) use of barge-in, (p) low average recognition confidence, (q) percentage of rejected recognitions, (r) percentage of completed operations, (s) percentage of aborted operations, and (t) relative usage of a voice tree branch.

14. The method of claim 13, wherein the user expertise evaluator module is further configured to automatically detect the indication of an expertise level in response to the microphone receiving the audio speech signal.

15. The method of claim 14, further comprising:
determining a set of voice tree adjustments in response setting the expertise level.

16. The method of claim 15, wherein the expertise level is selected from a set of greater than two expertise levels.

17. The method of claim 16, wherein the set of setting adjustments comprises at least one of:
an end of utterance timing adjustment,
a start of utterance timing adjustment,
a graphical user interface assistance adjustment,
an audio assistance adjustment, and
a rejection threshold level adjustment;
wherein the method further comprises continuously conducting the evaluation of the user interactions and wherein the plurality of rules are a part of an expert system or a knowledge-based system.

* * * * *